May 23, 1939.    F. BROSCH    2,159,372
SPEED-CHANGING ADAPTER FOR MOTION PICTURE CAMERAS
Filed April 27, 1938
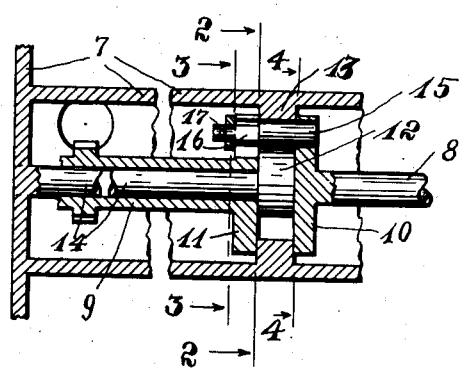
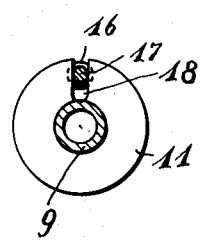
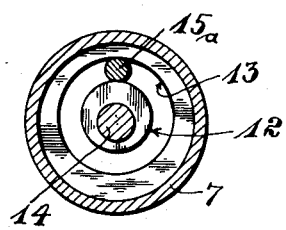
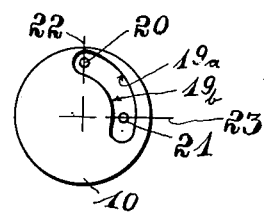
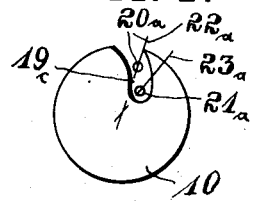
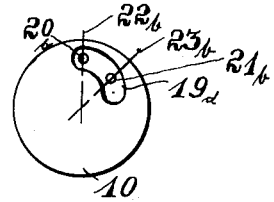
FRITZ BROSCH,
INVENTOR.
BY Otto H. Ruger,
HIS ATTORNEY.

Patented May 23, 1939

2,159,372

UNITED STATES PATENT OFFICE 2,159,372

SPEED-CHANGING ADAPTER FOR MOTION PICTURE CAMERAS

Fritz Brosch, Los Angeles, Calif.

Application April 27, 1938, Serial No. 204,590

3 Claims. (Cl. 74—63)

This invention relates to mechanisms for changeably controlling the speed at which the film-moving parts of a camera are operating.

One of the objects of this invention is to provide an insertion in the normal mechanisms of a camera by which to control the speed.

Another object is to provide an insertion by which parts of a movement can be controlled at one speed while another part of the movement can be controlled at another speed.

Another object is to provide means by which a film can be moved more quickly from one exposing position to the next, while retarding the movement during the exposures.

Another object is to provide mechanisms so designed that the parts may readily be exchanged for varying the speeds.

Other objects will appear from the following description and appended claims as well as from the accompanying drawing, in which Fig. 1 is a fragmentary longitudinal section of a mechanism designed to operate according to this invention.

Fig. 2 is a cross section on line 2—2 of Fig. 1, showing the control cam in end view.

Fig. 3 is a cross section through the hollow rotating shaft on line 3—3 of Fig. 1, showing the actuating cam in end view.

Fig. 4 is an end view of the actuated cam as seen in the direction of the line and arrows 4—4 of Fig. 1.

Fig. 5 is a similar view of a slightly modified form of actuated cam.

Fig. 6 is a similar view of another slightly modified form of actuated cam.

In motion picture cameras, the film is generally advanced in somewhat intermittent movements, each of such movements in itself quite fast and still consisting of two distinct portions. One portion of each of such intermittent movements clearly involves the period for exposure, while the other portion involves the period for advancing the film.

With due regard for proper exposure, it is of advantage to have the period of exposure extended as long as possible, while it would be of even greater advantage to advance the film from one exposure to the next with the greatest possible speed, to reduce the intermission between exposures to the shortest periods possible.

Letting 7 designate a part to be stationary with a camera, it should be understood that this may be an extra attachment, or a portion already existing in a camera, and, of course, that this part 7 may be arranged in suitable relation and proximity to the parts of the camera to be affected thereby, though it is not necessarily to be right next to the affected parts, since shafts can naturally easily be arranged to operate at any reasonable distance.

8 may designate such a shaft, to eventually connect with the already existing parts for advancing the film past the lens of a camera, wherever, or of whatever form such existing parts may be.

Such existing parts are of quite varying forms, but, regardless of the different forms, consist generally of a distinctly compact mechanism that as a whole is generally known as the movement, and since the word movement must be applied to quite a few operations in the present case it is thought best not to illustrate "the movement" at all, nor to make any further reference to it in this case.

The principal feature involved in this case is, moreover, concerned only with the control of the two distinct portions of the movement already referred to in the beginning of this specification, being the portions of each of the film-advancing movements, or operations.

It concerns then means by which the shaft 8 may be actuated quicker during the advancing period while slower during the exposing period of each of such movements.

As illustrated, this may be accomplished by means of slip-cams.

Between the actuated shaft 8 and the actuating shaft 9, certain cooperating cams have been inserted and mounted in the part 7 of Fig. 1.

The shaft 8 itself is provided with a flange-like portion 10, which embodies one cam, in form of a curved slot.

The hollow shaft 9 is also provided with a flange-like portion, indicated at 11, which embodies another cam, in form of a radially disposed slot.

A third cam is indicated at 12, and a fourth cam is indicated at 13; these last two cams being stationary with the part, or housing, 7, the cam 12 being provided on a centrally disposed pin 14, while the cam 13 is provided directly in the housing 7; the two faces of these cams being directly opposite one another forming a circular channel, as more clearly illustrated in Fig. 2.

All these cams cooperate by means of the pin 15, which has a distinct flattened portion 16 and a reduced pin-end 17, the flattened portion 16 being designed to ride slidingly in the radial slot 18 of the cam 11, as more clearly illustrated in Fig. 3.

The flattened and reducing of the pin 15 provides suitable shoulders by which the pin may be held to some extent against undue and undesired movements and vibrations.

The stationary double cam in the housing, consisting of the two oppositely disposed faces 12 and 13, serves to actuate the pin 15 radially within the limits of the slot 18.

From the illustration in Fig. 2, it will be understood that the pin 15 is in its outermost position at the point indicated at 15a, being over the peak, or apex, of the cam 12, and, from this, it will be understood that, with half a turn of the hollow shaft 9 with the cam 11, the pin 15 will come to its innermost position over the lowermost point of the cam 12.

This radial movement of the pin 15 is preferably made positive in both directions by means of the oppositely facing cams 12 and 13, inasmuch as cameras operate exceedingly fast, and since it is desirable to make sure of such movements in order to procure the desired results of full stroke movements.

Otherwise, it must be understood that a single cam might eventually be made to move the pin in one direction, while a spring might be used for returning the pin in the opposite direction, but it would have to be realized that a spring could fail to bring the pin back quick enough or to the full end of its stroke in especially fast moving cameras.

This radial movement of the pin 15 is utilized to transmit a varying speed from the hollow shaft 9 to the shaft 8 to the extent of transforming any certain speed of the shaft 9 into a different speed in shaft 8.

To accomplish this, some sort of slip-cam is provided on shaft 8, the cam 10 having for this purpose a curved, or suitably shaped slot.

In Fig. 4, this slot embodies two oppositely disposed faces 19a and 19b so that, while the shaft 9 rotates half a turn before the pin 15 moves from one extreme position to the opposite in a radial direction, the same pin 15 will slip for about a quarter of a turn from the point 20 to the point 21 within the cam 10, the quarter turn being more distinctly indicated by the lines 22 and 23.

This slipping results in a slower movement of the shaft 8 as compared with the movement of the hollow shaft 9.

Comparing this illustration of Fig. 4 with the illustrations of Figs. 5 and 6, it will be clear that the extent of the slipping may be had for any desired periods within reasonable limits by changing the shape of the slip-slot in the cam 10 so that this arrangement may result in a slip-cam movement that may transmit a retarded movement for one period and an advancing movement for another period of each revolution between the shafts 9 and 8, since, as the pin 15 is forced outwardly again by means of the double cam 12—13, the pin is also forced outwardly in the slip-cam 10.

In Fig. 6, the slip-cam is especially steep, to move the pin between the points 20a and 21a within an angle indicated between the lines 22a and 23a; while in Fig. 5, the movement of the pin is a little less steep between the points 20b and 21b, as indicated by the angle lines 22b and 23b.

With the steep slip-cam 19c of Fig. 6, it might be said that the cam 10 is taken right along with almost equal speed of the cam 11 during the first half rotation of the shaft 9, the shaft 8 being retarded only by the difference of a small angle; and equally advanced in speed to the extent of the same angle during the second half of the rotating of the shaft 9.

With the slip-cam 19d of Fig. 5, the extent of the retarding and advancing of the speed of the shaft 8 with respect to the speed of the shaft 9 is clearly increased considerably.

From this it should be clear that it is merely a matter of providing a suitable slip-cam, to obtain a desired retarding of the movement during the period of exposure of a film; while, by the same means, a distinct increase in the speed may be obtained during the period of advancing the film from one exposure to the next, to result in a diminishing of the flickering and a closer following of succeeding exposures.

It should furthermore be understood that the control cam with the involved oppositely faces 12 and 13 need not necessarily be of absolutely a round form as illustrated, and that slight variations may easily be made without difficulties, whereby the retarding, or advancing periods, or movements, may readily be extended in the exposure period, or shortened in the advancing period of each rotation within the scope of this invention.

The word camera should not be held as a limitation and it should be understood that this applies as well to similar apparatus, or mechanism, where such variable film movements, or similar actions are of value.

Having thus described my invention, I claim—

1. In a motion picture camera, in combination with the film-advancing means, an actuating shaft having a cam involving a radially disposed slot, a stationary control-cam involving oppositely disposed parallel faces forming a channel, an actuated shaft having a cam involving a slip-slot, and a pin having a flattened and shouldered portion slidingly mounted in the slot of the cam of the actuating shaft and extending into said channel and slip-slot so as to transform each of the rotating movements of the actuating shaft into distinct retarded and advancing movements on the actuated shaft.

2. In a speed changing device, a housing embodying an annular cam disposed eccentrically about a certain axis, actuating and actuated members disposed to rotate about said axis, one of said members having a guiding slot disposed in radial relation to said axis and the other member having a guiding slot non-concentrically passing the axis, and a pin with its axis parallel to the first-named axis disposed through the annular cam and through the slots.

3. In a speed changing device, a housing embodying a stationary annular cam disposed eccentrically about a certain axis, actuating and actuated members disposed to rotate about said axis in the housing, one of said members having a guiding slot disposed in radial relation to said axis and the other member having a guiding slot non-concentrically passing the axis, and a pin with its axis parallel to the first-named axis and disposed through the annular cam and through the slots in such a manner as to transmit rotating movement from one member to the other.

FRITZ BROSCH.